Oct. 15, 1935.    J. W. McNAIRY ET AL    2,017,699
CONTROL SYSTEM
Filed Aug. 21, 1934
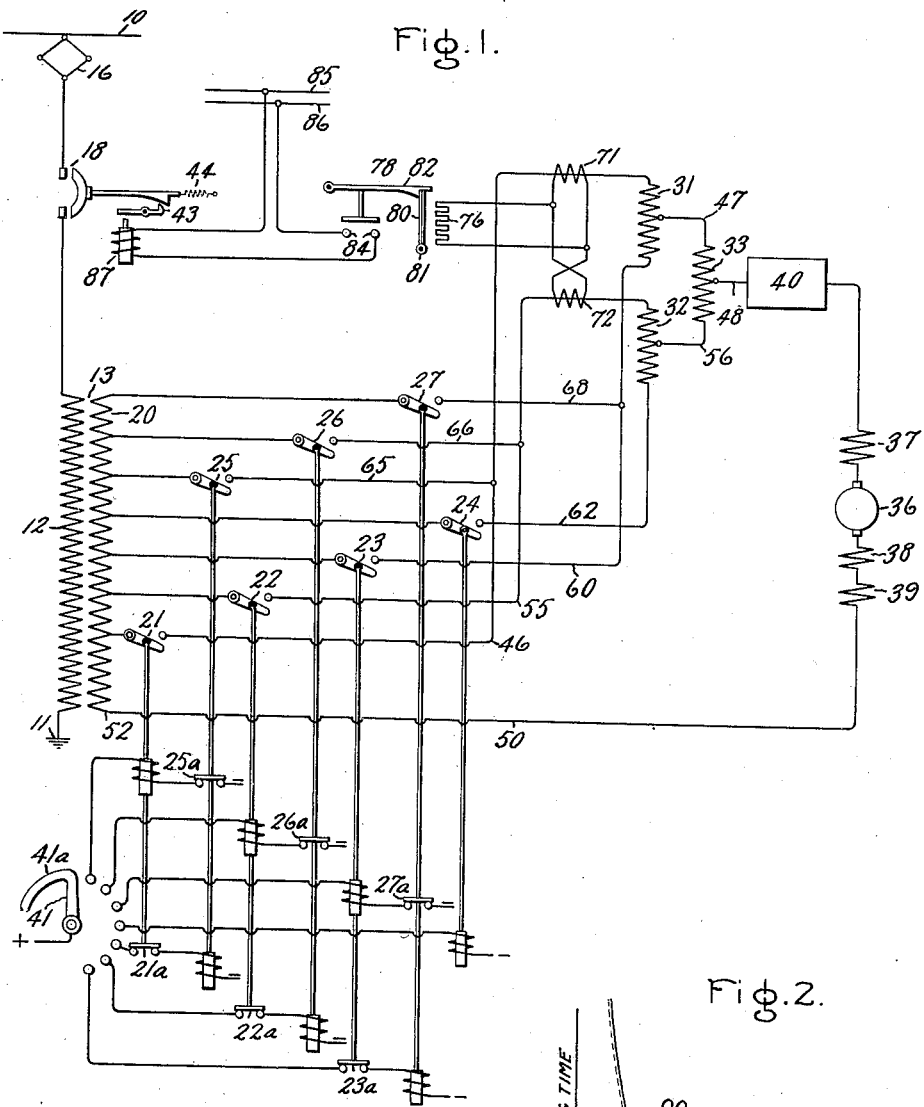
Fig.1.
Fig.2.
Fig.3.
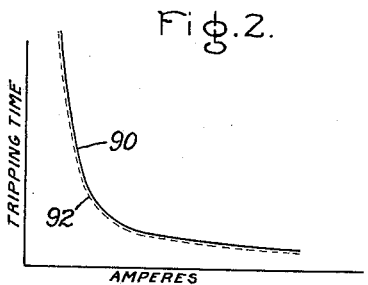
Inventors:
Jacob W. McNairy,
John F. Tritle,
by Harry E. Dunham.
Their Attorney.

Patented Oct. 15, 1935

2,017,699

UNITED STATES PATENT OFFICE 2,017,699

CONTROL SYSTEM

Jacob W. McNairy and John F. Tritle, Erie, Pa., assignors to General Electric Company, a corporation of New York Application August 21, 1934, Serial No. 740,777

8 Claims. (Cl. 172—179)

Our invention relates to control systems, more particularly to multivoltage control systems utilizing preventive coils, and has for its object the provision of means for protecting the preventive coils.

At the present time the common practice in controlling the speed of alternating current railway driving motors of the commutator type is to utilize a transformer provided with a plurality of voltage taps and to vary the voltage applied to the motors by completing in a predetermined order the connections between the motors and the transformer taps. By including preventive coils in the motor circuit the transition between transformer taps can be accomplished without interrupting the power flow to the driving motors.

We have found that under certain conditions of operation one of the tap switches used to complete a connection between a transformer tap and a preventive coil may become locked in the closed circuit position by reason of the welding of the contacts, so that an abnormally high voltage is applied to a preventive coil by the subsequent closing of other of the tap switches. If such a fault is not cleared immediately, the temperature of the preventive coil rises above normal resulting from excessive exciting or circulating current caused by the overvoltage. The temperature may rise sufficiently to damage the coil, the resulting short circuit causing the disablement of the entire driving system.

In carrying out our invention in one form thereof, we provide a thermal protective device responsive to the difference between the current flowing through a pair of parallel connected preventive coils, the thermal device being arranged to reproduce the temperature of the preventive coils and to operate upon an undue rise in the temperature of the preventive coils to deenergize the preventive coils and the driving motors.

Since the thermal protective device is responsive only to the difference between the currents flowing through the respective preventive coils, normal loads and overloads in no way affect the relay. This feature is important because the locomotive driving motors may often be called upon to operate for short intervals above normal load. The thermal device does not limit this normal operation in any way but protects the coils at all times from temperatures above their normal operating temperatures.

In starting the driving motors from rest, our invention can be utilized to perform an additional protective function. For example, if the controller is notched to a position where a larger current flows through one of the coils, the thermal protective device will operate after a predetermined time interval. For the first accelerating position of the controller there is always an unbalanced current flow. Consequently, if the motors fail to start, the protective device after the time interval automatically deenergizes the motors, and thereby prevents over-heating of the motors and possibly destructive arcing at the commutator resulting from a sustained application of power without rotation of the motors.

For a more complete understanding of our invention, reference should now be had to the accompanying drawing wherein we have shown diagrammatically in Fig. 1 a control system embodying our invention; Fig. 2 illustrates curves explanatory of our invention; while Fig. 3 is a sequence table showing the order in which tap switches are closed.

Referring to the drawing, we have shown our invention in one form as applied to an alternating current locomotive driving system of a type well understood to those skilled in the art. Therefore only so much of the system will be described in detail, as will be necessary for a clear and complete understanding of our invention. The locomotive is supplied with power from a single phase source of supply indicated by the trolley line 10 and the ground connection 11, a primary winding 12 of a transformer 13 being connected between the supply lines 10 and 11 by means of a pantograph 16 and a circuit breaker 18. The secondary winding 20 of the transformer 13 has a plurality of voltage taps connected directly to tap switches 21 to 27, inclusive, the tap 25 switches being connected to preventive coils 31, 32, and 33. The preventive coils, each having an iron core and a fairly high reactance, are connected in series circuit relation with a railway driving motor 36 of the commutator type, the coils 31 and 32 being connected in parallel circuit relation with each other. The motor 36 is provided with an exciting field winding 37, a compensating field winding 38 and an interpole field winding 39. As shown, a control box 40 is connected in circuit with the motor 36 to represent diagrammatically additional control devices that are ordinarily provided in the system, particularly when a plurality of driving motors are used.

The tap switches 21 to 27, inclusive, are closed in a predetermined sequence as indicated by the table shown in Fig. 3, the operation of the tap switches being controlled by a master controller 41 operable through a plurality of accelerating notches or positions. The energizing circuits for the operating coils of the tap switches 21 and 25 are electrically interlocked respectively by interlock contacts 21a and 25a. Similarly the circuits for the associated pairs 22, 26 and 23, 27 of the tap switches are electrically interlocked by interlock contacts 22a, 26a and 23a and 27a.

In the operation of our invention it will be assumed that the circuit breaker 18 has been operated to and latched in its closed circuit position by a latching member 43, a spring 44 being provided to bias the circuit breaker to its open circuit position. The controller 41 is operated to its first accelerating notch to complete an energizing circuit from the positive source of supply, operating coil of switch 21 and by interlock contacts 25a to the negative source of supply. The tap switch 21 thereupon operates to its closed circuit position to apply a relatively low voltage to the motor 36. This circuit may be traced from tap switch 21 by conductor 46, the upper half of preventive coil 31, conductor 47, the upper half of preventive coil 33, conductor 48, control box 40, compensating field winding 37, the armature of motor 36, motor field windings 38 and 39 and by conductor 50 to the lower end 52 of the secondary winding 20. The voltage applied to the motor will be the voltage between the top switch 21 and the end 52 of the secondary winding minus the reactive voltage drops in the preventive coils 31 and 33.

For the second accelerating position of controller 41, the tap switch 22 is also closed to complete an energizing circuit from the tap switch 22 by conductor 55, the upper half of preventive coil 32, conductor 56, the lower half of preventive coil 33, conductor 48, control box 40, motor field winding 37, the armature of motor 36, field windings 38 and 39 and by conductor 50 to the lower end 52 of the secondary winding. The voltage applied to the motor 36 is correspondingly increased. The controller 41 is provided with a contact arm 41a which is of sufficient length to maintain closed the energizing circuits for four adjacent tap switches.

With the controller occupying its third accelerating position, the tap switch 23 is closed to further increase the voltage applied to the motor. The circuit completed may be traced from the tap switch 23 by conductor 60, the lower half of preventive coil 31, conductor 47, upper half of preventive coil 33, control box 40, the motor 36 and its field windings, and by conductor 50 to the lower end of the secondary winding 20.

For the fourth accelerating position of controller 41, the tap switch 24 closes to connect by conductor 62 the lower half of the preventive coil 32 to the secondary winding, the current flow being by way of the lower half of the preventive coil, the conductor 56, the lower half of preventive coil 33, control box 40, motor 36 and by conductor 50 to the lower end of secondary winding 20.

With the controller 41 in the fifth accelerating position, the tap switch 21 opens before the tap switch 25 closes, because of the electrical interlocking provided. This electrical interlocking prevents the short circuiting of that part of the transformer winding connected between the tap switch 25 and the tap switch 21.

For the sixth accelerating position of the controller 41, the tap switch 22 opens, the tap switch 26 then closing to connect the upper half of preventive coil 32 by conductor 66 to the secondary winding, the electrical interlocking provided by interlock contacts 22a and 26a insuring this described sequence.

As the controller 41 is operated to the seventh and last accelerating notch, the tap switch 23 opens and the tap switch 27 closes to connect the upper end of the transformer secondary winding 20 by conductor 60 to the lower half of the preventive coil 31. The maximum voltage is now applied to the motor 36. The interlock contacts 23a and 27a serve to insure correct operation of the tap switches 23 and 27.

It will, of course, be understood that in many applications a great many more tap switches may be provided so that the increments in motor voltage will be much less than as indicated in the present system. Furthermore instead of direct acting solenoids, magnetically controlled air operated tap switches can be used.

In the form of our invention shown each preventive coil is provided with a saturable core to increase its reactance. This high value of reactance, however, causes a large transient current at the moment the open side of a preventive coil is connected to the secondary winding, this transient current sometimes being of sufficient magnitude to cause the contacts of a tap switch to weld together. The subsequent closing of the remaining tap switches then subjects the preventive coil to an unduly high voltage.

Assuming, for example, that the contacts of the tap switch 21 are welded together an excessively high voltage will be applied to the preventive coil 31 as soon as the tap switch 27 is closed, since under these conditions the preventive coil 31 is subjected to the voltage between tap switches 21 and 27. The tap switch 25, being electrically interlocked by contacts 21a with tap switch 21, does not close. The remaining switches 22, 23, 24, 26, and 27, however, are closed in sequence as described above. We have found that under these abnormal conditions, the current flowing through preventive coil 31 is much greater than the current flowing through the preventive coil 32, the increase being due to the rise in the circulating or exciting current produced by the voltage between tap switches 21 to 27, inclusive. Consequently by providing current transformers 71 and 72, the primaries of which are connected respectively in series with the preventive coils 31 and 32 and the secondaries of which are differentially connected together, a reliable indication of a welded contactor can be obtained in response to the unbalanced current flow. Normally a low value of exciting current flows through the preventive coils. However, when the voltage on one coil is excessively high a large exciting current flows—a value corresponding to the vector difference between the current flowing through the two preventive coils 31 and 32.

The current flow produced by the current transformers 71 and 72 can be used to sound an alarm, although we prefer to connect the current transformers to a heating coil 76 of a thermal device 78 connected to deenergize the supply transformer 13. When a predetermined current flows through the heater coil 76 for a predetermined time, a bimetallic thermal element 80 bends in a clockwise direction about a fixed support 81, the free end of the element releasing a pivoted switch member 82 for operation to a closed circuit position. Consequent to the closing of the contacts 84 by the switch member 82, an energizing circuit is completed from supply lines 85 and 86 for a tripping coil 87 of the circuit breaker 18, the coil thereupon operating the latch 43 for operation by the opening spring 44 to its open circuit position. Of course, after the welded contacts of the tap switch 21 have been separated, the device 78 is manually reset and the circuit breaker 18 relatched in its closed circuit position.

Since the overheating of a preventive coil causes it to fail, we arrange the bimetal thermal element 80 and its heating coil 76 with respect to each other so that the temperature of the element 80 rises at the same rate that the temperature of the preventive coil rises above its normal operating temperature. Thus by referring to Fig. 2, it will be seen from the preventive coil temperature curve 90, plotted with the time required to reach the maximum permissible temperature from its normal operating temperature as ordinates and ampere current as abscissæ, that this time rapidly decreases as the exciting current increases. The relay characteristic curve 92 has the identical shape as the curve 90 but is displaced from it a slight amount. Consequently, for a given excess voltage condition the time for the relay 78 to trip is slightly less than the time required for the preventive coil to reach an abnormally high temperature. The bimetal element 80, therefore, operates coincidentally with a predetermined rise in the temperature of the preventive coils 31 and 32 above their normal operating temperature to deenergize the coils.

In the form of our invention shown, the thermal device 78 besides protecting the preventive coils from high temperatures, also protects the commutator of motor 36 from undue burning in cases where the motor does not start to rotate on the first and third accelerating notches.

With the controller 41 in its first position, current flows through the upper half of the preventive coils 31. The current transformer 71 causes current to flow through the heater coil 76 of the relay 78. If this current flow continues for a predetermined time the bimetal thermal element 80, in accordance with its adjustment, releases the switch member 82 causing the opening of the circuit breaker 18. With the controller in the second position current flows through the upper half of preventive coil 31 and through the upper half of preventive coil 32, the current flow through the respective preventive coils 31 and 32 being about equal. However, when the controller is operated to the third accelerating position, the current through the preventive coils 31 and 32 is again unbalanced so that the heater coil 76 is correspondingly energized and will operate after a predetermined time to open the circuit breaker 18.

In the fourth accelerating position of the controller, the tap switches 21 to 24, inclusive, are closed and both ends of the respective preventive coils 31 and 32 are connected to the transformer secondary winding 20. The current flow through the preventive coils is now equal and no resulting current flows through the heater coil 76. As the controller is advanced through its additional accelerating positions, the current divides equally between the preventive coils unless, of course, one of the tap switches remains in closed position when it should have opened. If the controller is permitted to remain in either the first or the third position, the relay 78 will operate after a predetermined time to deenergize the contactor 18. Aside from protecting the commutator from burning as a result of failure of the motor to start, it is not possible to maintain an unbalanced current through the preventive coils after the predetermined time interval required for the operation of the relay. Of course, the relay 78 can be adjusted so that it will not respond to the unbalanced current but will operate only in response to the higher values of exciting current incident to the application of an excessively high voltage to one of the preventive coils.

While we have shown a particular embodiment of our invention, it will be understood, of course, that we do not wish to be limited thereto since many modifications may be made, and we, therefore, contemplate by the appended claims to cover any such modifications as fall within the true spirit and scope of our invention.

What we claim as new and desire to secure by Letters Patent of the United States is:

1. A control system comprising a transformer provided with primary and secondary windings, a plurality of voltage taps for said secondary winding, a pair of preventive coils, tap switches operable in predetermined sequence for connecting said coils to said voltage taps by circuits electrically independent of each other so as to increase progressively the voltage applied to said preventive coils, time delay means responsive only to a circulating current of a predetermined value through one of said circuits for deenergizing said preventive coils.

2. A control system comprising a variable voltage supply means, circuit control means for deenergizing said supply means, preventive coils, a load circuit connected to the mid-portions of said preventive coils, switch means for connecting the respective ends of at least two of said preventive coils to said supply means in predetermined sequence for the supply of current to said load circuit, and thermal means responsive only to a predetermined circulating current in one of said preventive coils for operating said circuit control means to deenergize said supply means.

3. In combination, a motor, variable voltage supply means therefor, circuit control means operable to deenergize said supply means, preventive coils operable at predetermined temperatures connected in parallel circuit relation with each other between said supply means and said motor, and means responsive to a predetermined difference between the current flowing respectively through said preventive coils for operating said circuit control means to deenergize said supply means when the temperature of the coil carrying the large value of current approaches a predetermined high value.

4. In combination, a motor, variable voltage supply means therefor, preventive coils connected in parallel circuit relation with each other and in series with said supply means and said motor, said coils being heated by the flow of current therethrough, circuit control means for deenergizing said preventive coils, and time delay means responsive to a predetermined difference between the current flowing through said respective preventive coils for duplicating the heating of said preventive coils, and means responsive to the operation of said time delay means for operating said circuit control means to deenergize said supply means.

5. The combination with an alternating current source of supply, of a transformer provided with a primary winding and a secondary winding, a circuit breaker for connecting said primary winding to said source of supply, an electrical translating device, preventive coils operable at a predetermined normal temperature connected in parallel circuit relation with each other and in series circuit relation wtih said translating device, control means connected between said preventive coils and said secondary winding for controlling the voltage applied to said translating device, thermal means responsive to the vector difference between the current flowing through said preventive coils for reproducing a rise in the temperature of said preventive coils above their normal temperature, and for operating said circuit breaker to disconnect said primary winding from said supply means when the temperature of said preventive coils exceeds a predetermined temperature.

6. In combination, a supply transformer provided with a plurality of transformer voltage taps, a load circuit, a pair of preventive coils, a third preventive coil connecting said pair of preventive coils in parallel circuit relation with each other, a load circuit connected to the midportion of said third preventive coil, a controller for connecting in predetermined sequence the ends of said pair of preventive coils to selected transformer voltage taps corresponding to progressively increasing voltages, differentially connected current transformers responsive to the current flowing to corresponding ends of said pair of preventive coils, control means connected to said current transformers and operable by the predetermined difference of current flowing to said corresponding ends of said preventive coils, said difference of current flow occurring when said controller is operated through a predetermined number of accelerating positions, and means responsive to the operation of said control means for deenergizing said preventive coils and said load circuit.

7. In combination, a supply transformer provided with a primary winding and a secondary winding, a circuit breaker for controlling the energization of said primary winding, said secondary winding being provided with a plurality of transformer taps, a load circuit, a pair of preventive coils, a third preventive coil having its respective ends connected to the midportions of said pair of preventive coils, means connecting the mid-portion of said third preventive coil in series circuit relation with said load circuit, a plurality of tap switches for connecting the respective ends of said preventive coils to said transformer voltage taps, a controller operable through a plurality of accelerating positions for controlling in predetermined sequence the operation of said tap switches, the closure of the first and third tap switches causing a greater current to flow through one of said pair of preventive coils than through the other, time delay protective means responsive to the difference in current flowing through said pair of preventive coils and operable after a predetermined interval from one position to another, and means responsive to the operation of said protective means from said one position to said other position for operating said circuit breaker to deenergize said supply transformer.

8. In combination, a load circuit, a transformer provided with a plurality of voltage taps for controlling the current flow to said load circuit, a pair of preventive coils connected between said transformer and said load circuit, means for connecting in predetermined sequence the respective ends of said preventive coils to said voltage taps, thermal means for duplicating the heating of said preventive coils and operable from one position to another upon the attainment of a predetermined temperature, means for energizing said thermal means in response only to an abnormal circulating current through one of said coils, and circuit controlling means responsive to operation of said thermal means for deenergizing said transformer.

JACOB W. McNAIRY.
JOHN F. TRITLE.